R. MARKS & A. C. BEHNE.

Wheat Drill.

No. 116612

Patented Jul. 4 1871

Attest:
Jas. H. Layman
John Kilor

R. Marks & A. C. Behne
INVENTORS.
By Knight Bros.
Attys.

UNITED STATES PATENT OFFICE.

ROBERT MARKS AND ANDREW CRISTIAN BEHNE, OF CONNERSVILLE, INDIANA.

IMPROVEMENT IN GRAIN-DRILLS.

Specification forming part of Letters Patent No. 116,612, dated July 4, 1871.

*To all whom it may concern:*

Be it known that we, ROBERT MARKS and ANDREW CRISTIAN BEHNE, of Connersville, Fayette county, Indiana, have invented an Improved Wheat-Drill, of which the following is a specification:

This invention relates to that class of agricultural implements in which the wheat is conducted from the hopper and discharged into the grain-spouts by means of a feed-wheel that revolves in a horizontal plane, and our improvement consists, principally, in providing such wheels with ratchet-shaped teeth, which serve to deliver the grain in a steady and uniform manner.

Figure 1:
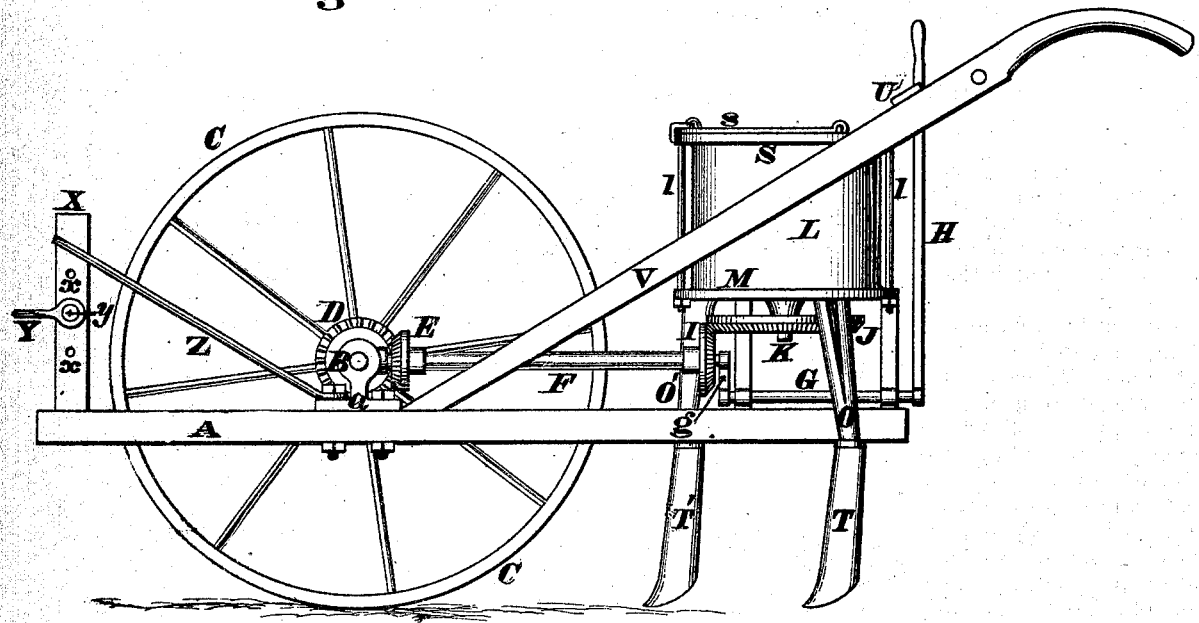
Figure 2:
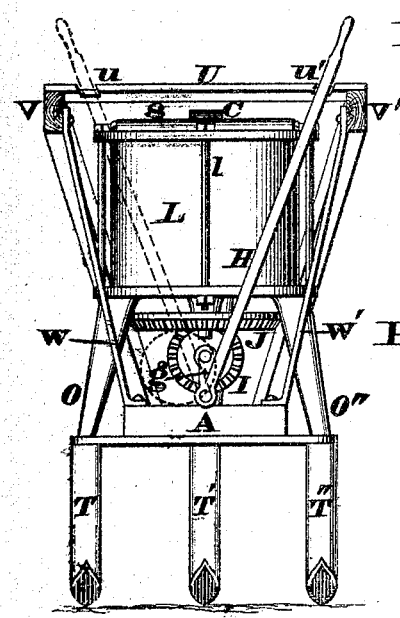
Figure 3:
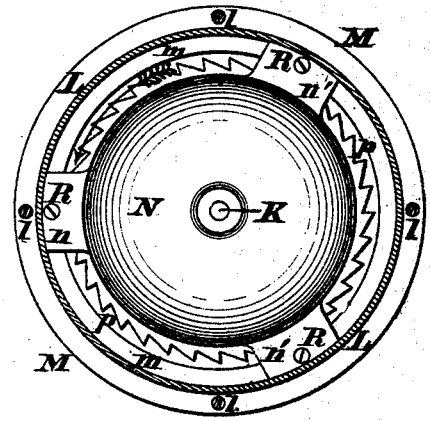

Figure 1 is a side elevation of a wheat-drill embodying our improvements. Fig. 2 is a rear elevation of the implement with the handles broken off, and Figs. 3 and 4 are, respectively, horizontal and vertical sections of the hopper on an enlarged scale.

A is the main frame of the implement, having journal-bearings, $a$, for the reception of the shaft B of ground-wheel C. Secured to the shaft B is bevel-wheel D, which gears with a similar wheel, E, that is secured to the front end of the rearwardly-projecting shaft F. The front end of shaft F rotates within the bearing $a$, while its rear end is journaled in the arm $g$ of rock-shaft G, which latter is operated at will by the limber lever H. Secured to the shaft F, near the arm $g$, is a bevel-wheel, I, that gears with a similar but horizontal wheel, J, which is secured to a shaft, K, that occupies an axial position with reference to the hopper L. The shaft K is journaled in the bed-plate M of the hopper, and also in a guard-plate or shield, N, that is placed near the bottom of said hopper. This guard-plate slopes down from its center to its periphery, as shown in Fig. 4, and it is provided with three equidistant lugs or projections, $n\ n'\ n''$, which are so arranged as to be located above the three grain-spouts O O' O''. Situated between the bed-plate M and shield N, and attached to shaft K, is a horizontal feed-wheel, P, whose periphery is provided with a series of ratchet-shaped teeth, $p$. R are screws or bolts, which, passing through the lugs $n\ n'\ n''$, serve to secure the shield N to the bed-plate M. The top of the hopper is surmounted by a cap, S, having a hinged lid, $s$, and said cap and the bed-plate M are united by bolts $l$. The bed-plate M has a dished portion or recess, $m$, within which revolves the feed-wheel P $p$. T T' T'' are the covering shares. U is a brace, which unites the two handles V V', and this brace is provided with two notches, $u\ u'$, for the retention of the lever H. W W' are braces, which extend from the frame A to the handles V V'. Attached to the forward end of the frame A is a beam, X, having a series of apertures, $x$, for the reception of the bolt $y$ of the shiftable clevis Y. Z are the rods, which extend from the beam X to the frame A.

Figure 4:
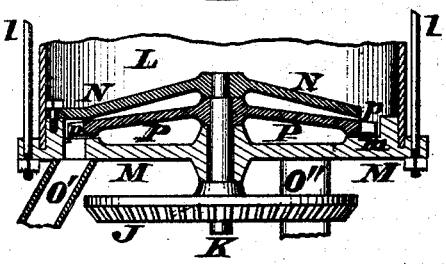

As the implement is drawn across the field the gearing D E I J compels the wheel P to rotate in the direction indicated by the arrow in Fig. 4, which act causes the teeth $p$ of said wheel to draw a regular and uninterrupted supply of grain from the hopper L and deliver it into the spouts O O' O''. The teeth $p$ are being filled with grain during the time they are passing from one of the lugs $n$ to the next one, and as soon as the teeth pass under said lugs they act as cut-offs. The guard-plate N, being placed above the feed-wheel P, keeps the main bulk of the wheat from pressing upon it, and, consequently, by diminishing the friction, enables the feed-movement to be operated with the least expenditure of power and with the utmost regularity.

Whenever it is desired to render the feed-mechanism inoperative, it can be done by simply shifting the lever H from the notch $u'$ to the one $u$, which act throws the wheel I out of gear with the one J, as indicated by the dotted lines in Fig. 2. If preferred, the gearing which operates the feed-wheel may be located beneath the frame A instead of above it, as here shown.

We claim as our invention—

The combination and arrangement of the guard-plate N having the lugs or cut-offs $n\ n'\ n''$, the feed-wheel P, provided with teeth $p$ for conveying the grain to the dropping-apertures, bed-plate M, spouts O O' O'', rock-shaft G, lever H, and gearing D E F I, substantially as and for the purpose specified.

In testimony of which invention we hereunto set our hands.

ROBERT MARKS.
A. CRISTIAN BEHNE.

Witnesses:
GEO. H. KNIGHT,
JAMES H. LAYMAN.